Patented Apr. 4, 1944

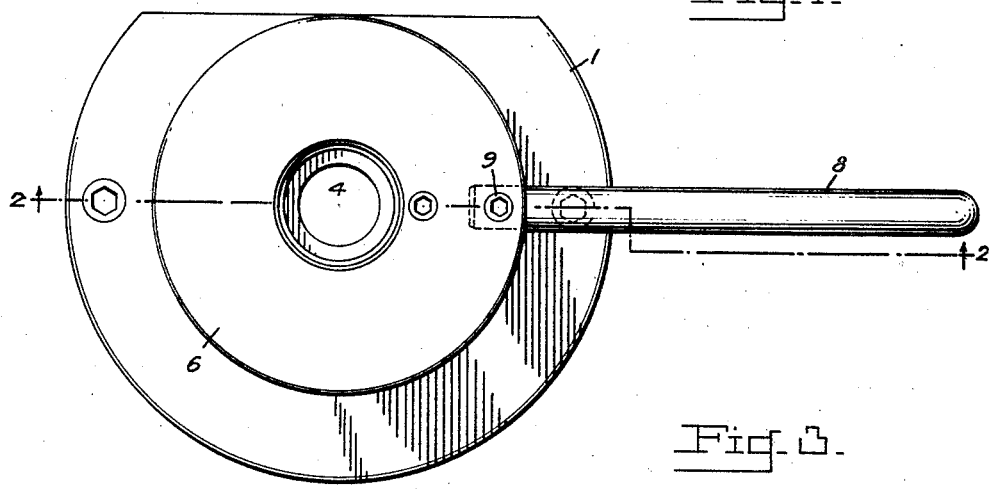
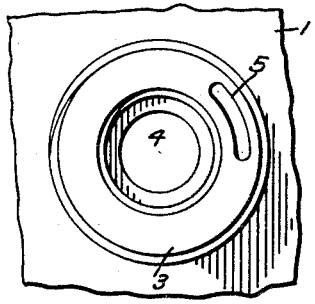
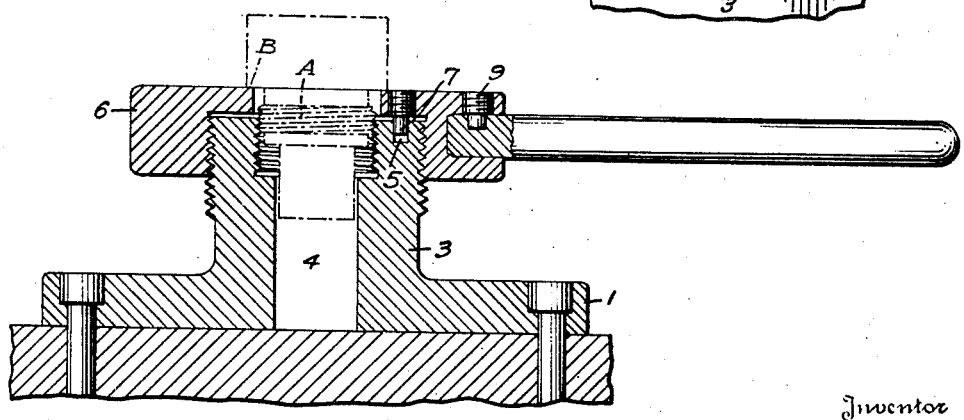

2,345,604

UNITED STATES PATENT OFFICE 2,345,604

GRIPPING DEVICE

Robert G. Jackson, Hopatcong, N. J.

Application April 23, 1943, Serial No. 484,280

1 Claim. (Cl. 29—89)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a fixture for conveniently, firmly and accurately holding, by engagement with the threads, any threaded or partially threaded component on which it is desired to perform any additional machining or assembling operation as may be required.

For convenience of description, the fixture hereinafter described, will be such as to have particular application in the assembly of the delay element into a primer body, but it is to be understood that the invention is not to be limited thereto.

In the assembly of certain primer bodies, it is necessary to incorporate into the body a threaded delay element. Heretofore in such assembly steps or operation, it has been necessary to utilize a tool or device to grip the threaded primer body in order to hold the body firmly engaged.

Heretofore this has been accomplished by gripping on surfaces of the primer body, other than the threaded portion. In order to avoid the use of costly tools, it has been necessary to machine or otherwise produce a surface accurate in relation to the threaded portions.

It is, therefore, an object of the present invention to provide a fixture which will serve to hold threaded components firmly in position by engagement on the threads with a minimum possibility of risk of distorting or injuring such threaded areas.

An outstanding feature of this invention is that with the utilization of the device hereinafter described, means are provided for conveniently and safely holding in locked position threaded components by means of gripping threaded portion. Another feature of the invention is the ease of removal of the components after the desired assembly step is performed.

The invention can best be understood from the following description to be read in view of the accompanying drawing in which:

Figure 1 shows a top plan view of the device,

Figure 2 is a cross sectional view of the device, taken on the line 2—2 of Figure 1, and Figure 3 is a view in detail of one feature of the device.

Referring to the drawing, I indicates the base of the fixture having holes drilled therein for the insertion of screws or bolts functioning to secure the fixture to a work bench.

An upright 3 medially located on the base, and forming part thereof has an external threaded surface, comprising threads of opposite hand from the thread of aperture 4 bored within the upright. It is to be understood that the depth, thread and bore of the aperture are to be determined by the dimensions of the component worked upon. Formed on the flat top surface of upright 3 is a radial groove 5 the function of which will be hereinafter set forth.

Positioned upon the upright 3 is an apertured cap 6 which has an internal thread corresponding to the thread of the upright 3 and engageable thereon. Extending through the cap, and slidable within the groove 5, is a pin 7, which serving in connection with groove 5 serves to limit the movement of the cap 6. For ease of manipulation and for control of the releasing action, I provide a bar lever 8, which fits into a hollow in the cap and rigidly held by a screw 9.

The functioning of the device in its application to the assembly of a delay element into a primer head is as follows: A suitable fixture is set up adapted to screw the delay element into a primer head. The device herein described is correctly positioned in relation to the fixture to be operated in synchronous movement.

As the component is being screwed into the fixture, the threads A of the component engage with the female threads of upright 3 and upon additional windings cause surface B of the component to lock firmly against the top of the cap 6. The primer head now being held in locked position, the turning operation is continued and the delay element is firmly seated in the primer head. To release the primer head from its locked position, the lever 8 is actuated to bring surface B of the component out of contact and engagement with the top of contact and engagement with the top of the cap 6. The component may then be readily removed. The lever 8 is then brought back to its starting position and the fixture is ready for reuse.

Having thus described the invention, what is claimed as new is:

A fixture device for holding for further operations a machine part having a head and a threaded stem, in combination, a base having an upright hub provided with a central aperture internally threaded to receive the threaded stem of the said machine part with the under-surface of its said head spaced from the top-surface of the said upright hub, and a cap member provided with a central aperture for the said stem of the machine part, the web of the said cap member being somewhat less thick than the said space between the head of the machine part and the top of the upright hub, the said upright hub and the said cap member being complemently threaded whereby the cap member may be screwed upwardly against the said under-surface of the head of the machine part to lock the said machine part in the device.

ROBERT G. JACKSON.